April 1, 1969  R. E. EMMONS  3,435,476
LOW FRICTION HINGE CONNECTION
Filed Oct. 19, 1967

ROBERT E. EMMONS INVENTOR.

BY *[signature]*
ATTORNEY.

United States Patent Office 3,435,476
Patented Apr. 1, 1969

3,435,476
LOW FRICTION HINGE CONNECTION
Robert E. Emmons, Goshen, Ind., assignor to Penn Controls, Inc., Oak Brook, Ill.
Filed Oct. 19, 1967, Ser. No. 676,455
Int. Cl. F16h 21/44, 25/18
U.S. Cl. 74—103     3 Claims

ABSTRACT OF THE DISCLOSURE

A hinge connection comprising two members formed of sheet metal which are removably interlocked one with the other at the hinge point, the interlocking and pivotal connection being accomplished by two tabs formed on a first one of the members and coined to provide a radius bearing surface for mating engagement with a slightly larger radius blanked on the second member, the tabs being oppositely disposed one from the other and providing rolling pivoting movement with a fixed position and ready assembly and disassembly.

---

The invention relates to a hinge connection and more particularly to a self-locking hinge connection with extremely low friction operating characteristics which may be readily assembled and disassembled without the use of fastening means.

Condition responsive control devices and the like generally use a lever to provide for efficient use of the sensor element (temperature, pressure or humidity) to operate an electrical contact. The lever also often provides a means of incorporating other features such as return springs, range adjustment and differential adjustments. In some such mechanisms the fulcrum consists of a metal pin passed through holes in the lever and the housing with appropriate keepers to retain the pin in position. In others a knife edge formed in the support is utilized as the fulcrum. In both arrangements there are disadvantages in that due to the pin shifting or the free floating effect of the knife edge there occurs undesired displacement of the switch actuator. Separate connectors are sometimes used to prevent displacement of the actuator. These connectors increase the size and expense of the hinge assembly and require additional assembly steps.

In carrying out the invention there is provided a self-locking hinge connection which provides for ready assembly of the hinge members without the need of additional fasteners and which provides rolling pivotal movement with extremely low friction and a fixed pivot position.

In a preferred embodiment, the hinge connection includes a main frame on which two tabs are formed to provide a fulcrum for the hinge. The tabs are coined to provide a predetermined radius which is mated to a slightly larger radius blanked out of the actuating lever. The tabs are oppositely disposed and bent inwardly and upwardly to cooperate with the associated blanked out portions of the lever for easy interlocking assembly of the lever to the support member. The hinge construction provides friction free rolling action in operation with a fixed pivot point of the pivoting lever to maintain accuracy of the control setting.

It is, therefore, an object of the invention to provide a self-locking hinge connection exhibiting low friction characteristics and which is readily assembled and maintains a fixed pivot point.

Features and advantages of the invention will be seen from the above, from the following description of the preferred embodiment, when considered in conjunction with the drawing and from the appended claims.

Figure 3:
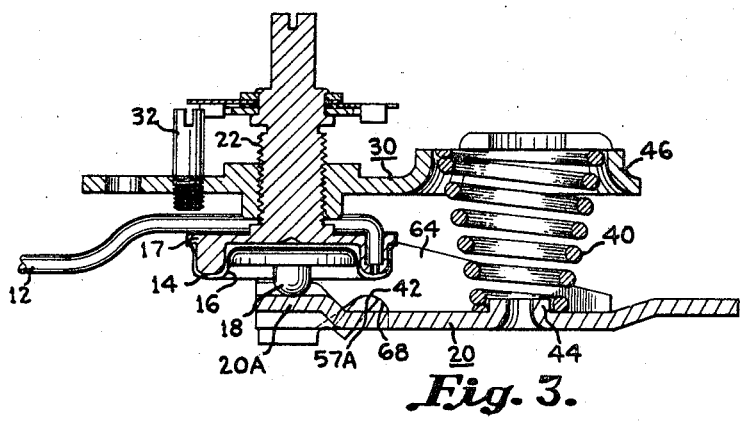
FIG. 3 is a cross sectional view, greatly enlarged, of FIGURE 2 taken along the line 3—3.

With reference to the drawing, for convenience the hinge construction is shown as being applied to a temperature responsive, charged element type control of electrical contacts. The temperature sensor is shown, for simplicity as being of the charged bulb type for sensing ambient temperature. The charged bulb (not shown) is connected by capillary tubing 12 to an expansible chamber 14 formed by one side of a diaphragm (FIG. 3) 16 and a support plate 17. Mounted on diaphragm 16 is an actuating button 18 which is biased against the left portion 20A of an actuating lever 20. Support plate 17 is provided with an upwardly extending threaded screw portion 22 which is adjustably threaded into a bore formed in control frame assembly 30. Rotation of threaded screw 22 in frame assembly 30 adjusts the position of the actuating diaphragm 16 and button 18 up and down in relation to lever portion 20A and functions as a range screw for the control. A stop 32 is threaded through frame assembly 30 and depends into position to act as a limit for upward movement of supporting plate 17.

A coil spring 40, under compression, biases lever 20 clockwise (FIG. 3) about its pivot point at 42, spring 40 being positioned with its bottom portion encircling a hub 44 projecting upward from lever 20 and with its upward portion lying within a concentric 46 formed in assembly 30 to prevent lateral shifting of the coil spring.

A lateral flange 48 (FIGS. 1, 2) is formed on the right hand portion of lever 20 in position to engage operating button 10 of an electrical switch (not shown).

Figure 4:
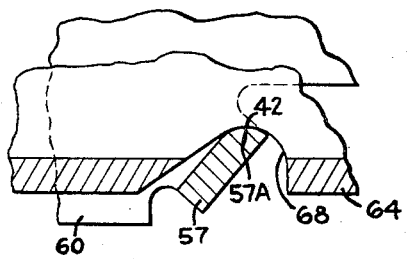
FIG. 4 is a fragmentary partial view of the fulcrum portion of the mechanism of FIGURE 3 further enlarged.

It may be seen, especially from FIGURE 4, that the operating point or fulcrum 42 of the lever 20 and frame assembly 30 is provided by two tabs 56 and 57 formed on depending flanges 59 and 60 respectively at either side of frame assembly 30. Tabs 56 and 57 are died and coined to shape and are bent-over inwards towards each other and the longitudinal axis of frame assembly 30 to provide a nest for lever 20. Each tab (56, 57) is turned upward and coined to provide an uppermost arcuate portion (56a, 57a) of a predetermined radius. Lever 20 is provided at each side with an upwardly extending flange 62 and 64. Blanked out of the upwardly extending flanges 62, 64 are notches 68 and 70. These notches are also each of arcuate shape and formed with a radius slightly larger than the radius died into the upper portion of tabs 56 and 57 for mating engagement therewith.

In assembly, lever 20 is merely slipped into nesting engagement within frame 30 so that tabs 56 and 57 at their arcuate portions 56a and 57a engage the arcuate portions of associated notches 68 and 70. Range screw 22 is then threaded into frame assembly 30 to a position placing button 18 of the temperautre responsive assembly into engagement with the left hand portion 20A of lever 20. Spring 40, under compression, is next slipped into nesting position between lever 20 and frame assembly 30 urging lever 20 clockwise about its operating point 42.

Figure 1:
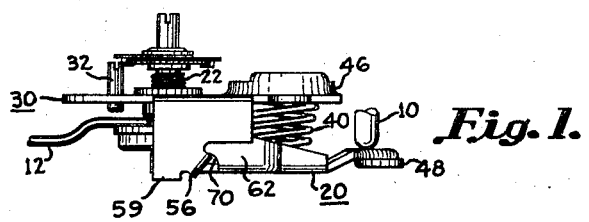
FIG. 1 is a simplified diagrammatic side elevational view of a portion of a temperature responsive control, showing a pressure actuator and an electrical contact operating pin interconnected by a lever of a hinge construction embodying the invention.
Figure 2:
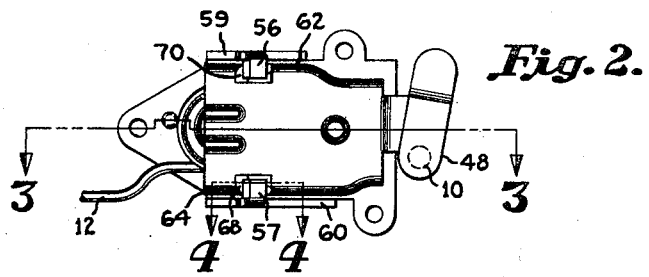
FIG. 2 is a bottom view of the mechanism of FIGURE 1.

With increasing temperature the pressure in chamber 14 increases, urging diaphragm 16 and button 18 downward. This forces lever 20 counter-clockwise about its operating point 42 pushing switch operating lever 10 upward. With a decrease in pressure, chamber 14 decreases in volume, causing return spring 40 to urge lever 30 clockwise about its operating point 42 allowing switch operating pin 10 to move downward (FIG. 1).

During such movement the radial portions 56a, 57a of tabs 56 and 57 roll on their mating notches 68 and 70 for relatively friction free operation while maintaining a fixed position at 42 of the pivot point of lever 20.

In one tested embodiment, frame assembly 30 and lever assembly 20 were both formed from strip steel of .063 inch thickness. The coined radius (56a, 57a) on tab (56, 57) was of .062 inch, while the blanked radius of each notch (68, 70) in lever 20 was .078 inch. The subject hinge assembly provides for easy assembly and disassembly of lever 20 from frame 30.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. A low friction hinge connection between a support and an actuating lever in which the lever is pivotable relative to the support and is releasably locked to the support against removal at the hinge connection comprising:

a support including a horizontally disposed central web portion and two depending side flanges interconnected by said central web portion, each of said depending flanges having a tab formed near its bottom end, said tabs being bent inwardly to face each other and upwardly towards said central web portion, each tab having a coined arcuate portion of a predetermined radius projecting upwardly, an actuating lever comprising a flat, horizontal intermediate web portion and two upwardly extending side flanges, said actuating lever having a notch formed at each side edge where its upwardly extending flange joins said intermediate web, said notches being colinear and having an arcuate shape at their uppermost edges of a radius slightly larger than said predetermined radius of said tabs, and said actuating lever being of a width dimensioned to fit into a nested position between said depending flanges of said support in position where the arcuate portions of said tabs mate with the associated notched arcuate bearing surfaces of said lever, each of said arcuate notched portions engaging an associated arcuate tab portion at point contact to provide rolling pivotal movement therebetween and releasable locked connection of said lever on said support.

2. A hinge connecton as set forth in claim 1 wherein there are included condition responsive force means positioned between the webs of said support and said actuating lever and at one side of said pivot point for urging said support and lever in opposite directions from each other about said pivot.

3. A hinge connection as set forth in claim 2 wherein there is provided biasing means positioned between the webs of said lever and said support and at the other side of said pivot point, for exerting a certain force in opposition to said condition responsive force means.

References Cited

UNITED STATES PATENTS

| 2,164,503 | 7/1939 | Desroche | 74—99 |
| 2,287,604 | 6/1942 | Comstock | 74—103 |
| 2,997,214 | 8/1961 | Miller | 74—99 |

FOREIGN PATENTS

| 925,172 | 3/1947 | France. | |

FRED C. MATTERN, JR., Primary Examiner.

W. S. RATLIFF, JR., Assistant Examiner.